Patented June 6, 1939

2,161,024

UNITED STATES PATENT OFFICE 2,161,024

COATED HARD RUBBER ARTICLE

Arthur K. Doolittle, South Charleston, W. Va., assignor to Carbide and Carbon Chemicals Corporation, a corporation of New York No Drawing. Application June 27, 1936,
Serial No. 87,668

4 Claims. (Cl. 91—70)

The invention relates to coated hard rubber articles, and it is particularly concerned with articles of this material having a strongly adherent and resistant surface coating or finish composed essentially of a vinyl resin.

The inherent nature of hard rubber presents surfaces in articles fabricated therefrom which have always been most difficult to finish with a suitably bonded coating material. It has in fact been heretofore quite impractical to apply a lasting color to hard rubber, since the commonly known paint and lacquer compositions are not sufficiently adherent to withstand soaking in water, high humidity, the action of alkaline cleaning agents, and other conditions encountered in the use of such articles.

In the development of vinyl resins, the art has made many suggestions for utilizing these materials in surface coatings of all types. However, physical and chemical characteristics inherent in the different classes of vinyl resins have largely precluded the widespread adoption of these materials as ingredients of surface coating compositions, and to my knowledge no satisfactory vinyl resin coatings of especial applicability to hard rubber surfaces have heretofore been proposed.

The principal object of this invention is to provide hard rubber articles, surface coated with a vinyl resin composition adapted to produce a finish thereon of strongly adherent and resistant characteristics. It is a further object to provide finishes for hard rubber surfaces of a brilliant color and permanency heretofore unknown.

I have found that these objects may be achieved, and that excellently bonded vinyl resin coatings, which are not affected by soaking in water or the action of dilute alkaline solutions, and which are chemically and physically resistant, may be formed on hard rubber by baking the applied vinyl resin coating at high temperatures. The best baking temperatures are above those at which vinyl resins will normally begin to decompose (that is, above about 275° F.), but I have found that by incorporating properly selected heat stabilizing materials with the resin, no decomposition whatever is encountered in the baked finish. Hard rubber articles may thus be finished with a clear and colorless coating or one of any desired color or shade, as will be more fully hereinafter described.

The vinyl resins with which this invention is concerned are those which may be prepared by the conjoint polymerization of vinyl halides, such as vinyl chloride, with vinyl esters of the lower aliphatic acids, such as vinyl acetate, propionate, butyrate, and formate. Preferred resins of this type may be prepared from vinyl chloride and vinyl acetate, in the proportions of about 60 to 95 parts of vinyl chloride to from about 40 to 5 parts of the acetate. Particularly desirable resins of this preferred group are those which contain from about 80 to 90 parts of the chloride. The vinyl resins and their production form no part of my invention. They may be made, for example, by the process set out in the patent to E. W. Reid, No. 2,064,565, issued December 15, 1936.

The heat stabilizers which I use in this invention are of two general groups. These groups are, first, metals and compounds of metals which form insoluble chlorine derivatives, (by which is meant that these metals or metal compounds form substantially water-insoluble products with chlorine or hydrogen chloride), and second, substances which have a mild reducing action. Heat stabilizers of either of the above groups are improved if they are additionally slightly basic in reaction. Also, stabilizers may be selected which are members of both classes, and their action is for that reason improved. If, in addition to being a member of both of the foregoing classes, the stabilizer is also slightly basic, it will be still more efficacious. Thus, lead sulfate, a member of the first-named group, is somewhat less desirable than basic lead sulfate, and lead sulfite, a member of both groups, is better than other lead salts or other sulfites. Mixtures of basic lead sulfate and lead sulfite are particularly effective.

The following are specific examples of stabilizers which are useful in my invention. Those representative of the first group, viz. metals and compounds of metals which form insoluble chlorine derivatives, are: blue lead (by which is meant the mixture of basic lead sulfate, lead sulfite, lead sulfide, zinc oxide, and a very small amount of carbon, commercially available under the proprietary designation "Sublimed Blue Lead"), white lead, red lead, lead chromate, lead hydroxide, lead monoxide, lead phosphate, lead sulfate, basic lead sulfate, lead sulfide, lead sulfite, lead phenolate, lead butyrate, lead compounds of other alcohols or organic acids, antimony oxide, mercurous oxide, silver sulfite, copper silicate, cuprous oxide, copper metal and bismuth trioxide. Typical examples of the second group, viz. mild reducing agents, are: aluminum metal, cadmium metal, cadmium sulfide, cadmium sulfite, calcium sulfite, cerium sulfite, magnesium metal, manganese silicate, sodium sulfite, strontium sulfite, and those sulfites and other reducing agents named in the first group. In general the stabilizers of the first named group are superior in action to those of the second group, and of all the stabilizers I have tested, the lead compounds have proved to be the best.

The amount of stabilizer may vary from 0.5% to 30% or even more of the formula weight, which means the total composition and may include solvents, plasticizers, dyes, pigments, and other ingredients. From this it follows that the proportions of stabilizer to vinyl resin may range between wide limits. For example, from 3 to 5 parts of stabilizer may be used to 1 part of vinyl resin, or 10 parts of vinyl resin may be used to 1 part of stabilizer. This is not to be understood as indicating that these proportions of stabilizer are required to prevent decomposition of the vinyl resin when the composition is baked, for the limits set forth are merely by way of example. It is possible to use many of the stabilizers of my invention as pigments, and when they serve a dual purpose in the composition, a quantity sufficient for both purposes is used. The quantity of stabilizer actually required may vary somewhat depending on the particular one chosen. For example, blue lead is not a single substance, but is a mixture containing some material of little or no stabilizing action. Therefore, a composition may require an amount of blue lead which is ten times the quantity of lead sulfite or some other undiluted stabilizer which is necessary, and even less lead phenolate or other soluble compound might be fully as effective as either.

The following examples will serve to illustrate the invention:

Example 1

A coating composition was made containing a vinyl resin resulting from the conjoint polymerization of vinyl chloride and vinyl acetate. The empirical composition of this resin was about 87 parts vinyl chloride and 13 parts vinyl acetate, and the resin was purified before use by extraction and partial precipitation from partial solvents to remove all unpolymerized material, catalytic residues, and more easily soluble polymeric fractions of lower average apparent molecular weight. The composition was as follows:

| | Percent by weight |
|---|---|
| Vinyl resin | 11.5 |
| "Sublimed Blue Lead" | 29.0 |
| Di (beta-butoxy ethyl) phthalate | 2.2 |
| Thinner | 57.3 |

The thinner, or solvent vehicle, was composed of the following solvents and non-solvents:

| | Percent by volume |
|---|---|
| Methyl isobutyl ketone | 40 |
| Dipropyl ketone | 10 |
| Toluene | 40 |
| Xylene | 10 |

This produced a coating of spraying viscosity in which the stabilizer, blue lead, served also as a pigment. Hard rubber surfaces were given a spray coat of this composition, and after air-drying and baking for ½ to 1 hour at a temperature of about 275° F. to 350° F., contained thereon a strongly adherent finish, characterized by total absence of decomposition of the vinyl resin.

This coating may serve as a prime coat over which additional coatings may be applied. Subsequent coats do not require a long bake, and will adhere well with very short bakes or after merely air-drying. The finishes so produced are unique, not only in the excellent adherence of the vinyl resin which otherwise would adhere but poorly, but also in the quality of finish produced. These finishes are tough, hard and durable, and resist weathering, grease, humidity and other severe conditions of exposure to a remarkable degree.

Example 2

A composition was made up as follows:

| | Percent by weight |
|---|---|
| Vinyl resin | 9.5 |
| Blue lead | 4.2 |
| Antimony oxide | 1.75 |
| Titanium oxide | 15.75 |
| Chrome yellow | 1.1 |
| Di-(beta-butoxy ethyl) phthalate | 3.5 |
| Blown castor oil | 0.2 |
| Thinner | 64.0 |

In this composition the vinyl resin and thinner used were the same as those described in Example 1.

The composition above is a light-colored pigmented base coat in which both blue lead and antimony oxide are used as stabilizers, and the coating formed on hard rubber, by application and baking as in Example 1, is very hard, resembling porcelain in some respects. It is characterized by excellent adherence and by the unique resistance which distinguishes all finishes applied to hard rubber in the manner of this invention.

Example 3

The following composition was made up to produce a clear finish:

| | Percent by weight |
|---|---|
| Vinyl resin | 15 |
| Lead phenolate | 1.5 |
| Thinner | 83.5 |

The vinyl resin and thinner used in this composition were the same as those referred to in the two preceding examples. Sprayed onto hard rubber and baked as in Example 1, an excellently adherent clear finish was produced, showing no coloration or decomposition of the vinyl resin film.

The foregoing examples are merely illustrative of my invention, and relate to specific embodiments of it. Other vinyl resins may be used, but this invention is directed especially to those which may be produced by conjoint polymerization of vinyl halides and vinyl aliphatic esters, and which normally are deficient in adhesion to surfaces of hard rubber. A variety of solvents, plasticizers, coloring materials and modifying materials may be present in the compositions, and those shown are in no way significant to my invention. Colors of a brilliant hue, as well as those of pastel shades, may in this manner be applied to hard rubber, and the finish bonded thereto with a permanency unknown in the prior art. The baking temperatures may vary from those indicated in the examples, being as low as 250° F., if desired, but preferably approaching 275° F. or higher. In general, those temperatures which are above the decomposition point of the vinyl resin alone are satisfactory. The time of baking is not critical, and the actual length of the bake required will vary somewhat with the size of the article finished. For most articles, the time of baking will range from about 15 minutes to 2 hours.

Modifications other than those indicated above are also possible, and are included in the invention as defined by the appended claims. This application contains subject matter in common with my copending application Serial No. 715,662, filed March 15, 1934, now Patent No. 2,140,518, issued December 20, 1938.

I claim:

1. A hard rubber article having a strongly adherent and resistant rubber-free surface coating thereon, essentially comprising a vinyl resin resulting from the conjoint polymerization of vinyl chloride with vinyl acetate and containing from 80% to 90% by weight of vinyl chloride, together with a heat stabilizing material of a metallic compound adapted to prevent decomposition of the vinyl resin when subjected to baking temperatures at which the vinyl resin alone would normally decompose, said coating being bonded to the hard rubber surface by baking.

2. A hard rubber article having a strongly adherent and resistant rubber-free surface coating thereon, essentially comprising a vinyl resin substantially identical with a resin resulting from the conjoint polymerization of a vinyl halide with a vinyl ester of an aliphatic acid, together with a heat stabilizing agent selected from the group consisting of organic and inorganic compounds of lead, antimony oxide, bismuth trioxide, copper metal, cuprous oxide, copper silicate, mercurous oxide, silver sulfite, aluminum metal, cadmium metal, cadmium sulfide, cadmium sulfite, calcium sulfite, cerium sulfite, magnesium metal, manganese silicate, sodium sulfite and strontium sulfite, said coating being bonded to the hard rubber surface by baking at a temperature at which said vinyl resin would be decomposed in the absence of said stabilizing agent.

3. A hard rubber article having a strongly adherent and resistant rubber-free surface coating thereon, essentially comprising a vinyl resin substantially identical with a resin resulting from the conjoint polymerization of a vinyl halide with a vinyl ester of an aliphatic acid, together with a compound of lead, said coating being bonded to the hard rubber surface by baking at a temperature above about 275° F.

4. A hard rubber article having a strongly adherent and resistant rubber-free surface coating thereon, essentially comprising a vinyl resin substantially identical with a resin resulting from the conjoint polymerization of vinyl chloride with vinyl acetate and containing from 80% to 90% by weight of vinyl chloride, together with a compound of lead, said coating being bonded to the hard rubber surface by baking at a temperature of about 275° F. to about 350° F.

ARTHUR K. DOOLITTLE.